United States Patent [19]

Paczonay

[11] Patent Number: 5,301,860
[45] Date of Patent: Apr. 12, 1994

[54] WATER SUPPLY APPARATUS FOR BICYCLE

[76] Inventor: Joseph R. Paczonay, 3050 Aptos Hill La., Aptos, Calif. 95003

[21] Appl. No.: 51,223

[22] Filed: Apr. 23, 1993

Related U.S. Application Data

[60] Division of Ser. No. 883,467, May 15, 1992, Pat. No. 5,215,231, which is a continuation-in-part of Ser. No. 685,387, Apr. 15, 1991, abandoned.

[51] Int. Cl.$^5$ .................. B62J 11/00; B62J 39/00
[52] U.S. Cl. .................. 224/32 R; 224/37; 224/39
[58] Field of Search .......... 222/610; 280/289 R, 280/288.4; 224/30 R, 31, 32 R, 35, 37, 38, 39, 42.45 R

[56] References Cited

U.S. PATENT DOCUMENTS

| | | | |
|---|---|---|---|
| 4,386,721 | 6/1983 | Shimano | 224/39 |
| 4,441,638 | 4/1984 | Shimano | 224/35 |
| 4,830,240 | 5/1989 | Tackles et al. | 224/35 |
| 5,040,709 | 8/1991 | Neugent | 224/35 |
| 5,145,138 | 9/1992 | Schlanger et al. | 224/32 R X |
| 5,170,981 | 12/1992 | Lin | 224/35 X |

FOREIGN PATENT DOCUMENTS

| | | | |
|---|---|---|---|
| 595703 | 4/1932 | Fed. Rep. of Germany | 224/35 |
| 4110221 | 10/1992 | Fed. Rep. of Germany | 224/32 R |
| 2636033 | 3/1990 | France | 224/32 R |
| 2647411 | 11/1990 | France | 224/32 R |
| 2663603 | 12/1991 | France | 224/35 |
| 9219487 | 11/1992 | World Int. Prop. O. | 224/32 R |

*Primary Examiner*—Andres Kashnikow
*Assistant Examiner*—Kenneth De Rosa
*Attorney, Agent, or Firm*—Thomas R. Lampe

[57] ABSTRACT

Apparatus for dispensing liquid into the mouth of a bicyclist, the apparatus including a container with a flexible wall, an adjustable holder for holding the container on a bicycle, a liquid delivery tube extending from the container, and at least one compressor arm actuatable by the bicyclist for compressing the container wall and forcing liquid into the liquid delivery tube. Valves connected to the liquid delivery tube prevent back flow of liquid in the direction of the container.

4 Claims, 8 Drawing Sheets

WATER SUPPLY APPARATUS FOR BICYCLE

This application is a divisional of application Ser. No. 07/883/467, filed May 15, 1992, now U.S. Pat. No. 5,215,231, which is a continuation in part of U.S. application Ser. No. 07/685,387, filed Apr. 15, 1991, now abandoned.

TECHNICAL FIELD

This invention relates to apparatus for dispensing water or other liquid to a bicyclist. More particularly, liquid is delivered through a liquid delivery tube from the interior of a container which is compressed by compression means actuatable by the bicyclist.

BACKGROUND ART

It is well known to mount a conventional water bottle on the frame of a bicycle which may be removed at the rider's discretion so that the water or other liquid within the container may be consumed. Since a conventional water bottle must be removed and held in one's hand during use, steering and balancing of the bicycle becomes more difficult. Furthermore, the act of drinking from a conventional bottle requires that the rider, to some degree at least, raise his body from the most efficient riding position.

A number of arrangements have been devised which enable a rider to drink or otherwise utilize the liquid contents of a container without removing the container from the bike frame or other structural element of the bike to which it is attached.

For example, U.S. Pat. No. 4,815,635, issued Mar. 28, 1989, discloses a water supply apparatus for use by a bicyclist employing a diaphragm-type pump located at the end of a piece of tubing, the other end of which is connected to a water bottle. The pump is operated by a lever located on the handlebars. The tubing provides a spray of liquid directed at the bicyclist but does not extend to the mouth of the bicyclist. Furthermore, the arrangement shown in this patent would appear to require a substantial amount of pumping to pump the water from the water bottle to reach the nozzle each time a drink is desired. Also, an empty water bottle cannot readily be exchanged for a full water bottle.

U.S. Pat. No. 4,911,339, issued Mar. 27, 1990, discloses a bicycle water pump in which a special water bottle has attached to its bottom portion a hand-operated bellows pump for pressurizing the inside of a water bottle. Pressure is maintained in the bottle by pumping the bellows. This takes the biker's attention away from the road and promotes instability. The water bottle employed utilizes special fittings at both ends, and the system is not easily removed from the bicycle.

U.S. Pat No. 4,095,812, issued Jun. 20, 1978, discloses a water bottle attached to a bicycle frame which has a long tube connected thereto, the distal end of the tube reaching to the mouth of the bicyclist. A reel is employed to store excess tubing. With this approach, the bicyclist must suck the water out of the bottle through a very long tube, obviously requiring substantial effort to do so. The force of gravity can cause the water or other liquid to revert back through the tube into the container interior so that a rider wishing to drink must again suck the liquid through the entire length of the tube.

U.S. Pat. No. 4,629,098, issued Dec. 16, 1986, discloses a portable liquid dispenser which utilizes a bulb which must be squeezed to pressurize the water bottle of the system. The bulb is obviously subject to wear and tear, and the fact that the bottle must remain under continuous compression means that the bulb, due to the likelihood of system leaks, must be worked with regularity to ensure proper operation. The apparatus disclosed in this patent would appear to have the deficiencies of all bicycle water delivery systems which require the interior of the supply container to remain under continuous pressure; that is, air or water leaks anywhere in the system due to seal failure or the like will render the dispenser inoperative.

Other representative patents disclosing liquid dispensing systems for use by bicyclists and others are as follows: U.S. Pat. No. 4,739,905, issued Apr. 26, 1988, U.S. Pat. No. 4,441,638, issued Apr. 10, 1984, U.S. Pat. No. 4,274,566, issued Jun. 23, 1981, U.S. Pat. No. 4,420,097, issued Dec. 13, 1983, U.S. Pat. No. 4,544,087, issued Oct. 1, 1985, U.S. Pat. No. 4,852,781, issued Aug. 1, 1989, U.S. Pat. No. 4,886,176, issued Dec. 12, 1989, U.S. Pat. No. 4,807,813, issued Feb. 28, 1989, U.S. Pat. No. 5,062,591, issued Nov. 5, 1991, U.S. Pat. No. 2,915,222, issued Dec. 1, 1959, U.S. Pat. No. 3,677,446, issued Jul. 18, 1972, U.S. Pat. No. 3,992,706, issued Nov. 16, 1976, U.S. Pat. No. 4,159,790, issued Jul. 3, 1979, and U.S. Pat. No. 4,284,209, issued Aug. 18, 1981.

In addition, U.S. Pat. Nos. 4,386,721, issued Jun. 7, 1983 and U.S. Pat. No. 4,830,240, issued May 16, 1989, disclose frames or fixtures which may be utilized to affix water bottles or containers to frames of bicycles.

U.S. Pat. No. 4,340,157, issued Jul. 20, 1982 discloses a self-sealing closure dispenser for plastic stain bottles. U.S. Pat. No. 4,928,859, issued May 29, 1990, and U.S. Pat. No. 5,027,855, issued Jul. 2, 1991 disclose quick-disconnect couplings.

DISCLOSURE OF INVENTION

The present invention relates to a relatively simple and inexpensive apparatus which efficiently delivers liquid from a container to the mouth of a bicyclist. The container need not have the interior thereof maintained under continuous pressure in order to accomplish its function. Furthermore, operation is effected by the rider in his or her normal riding position without the necessity of substantially changing body attitude or position. The apparatus also readily lends itself to disassembly for cleaning or storage. The structural elements of the invention cooperate to continuously provide a ready supply of water or other liquid at the location of the rider's mouth without the necessity of repeating the process of drawing liquid through the entire length of the liquid delivery tube employed in the apparatus.

The present apparatus is for dispensing liquid into the mouth of an individual riding a bicycle. The apparatus includes a container defining an interior for accommodating the liquid. The container has a flexible wall at least partially defining the interior.

Holder means is utilized for holding the container at a predetermined location on a bicycle and a liquid delivery tube extends from the container for delivering liquid from the container interior to the individual.

Compression means is actuatable by the individual for compressing the container wall and forcing liquid in the container into the liquid delivery tube. Valve means operatively associated with the liquid delivery tube is employed to prevent back flow of liquid within the liquid delivery tube in the direction of the container.

The compression means comprises at least one compression element movably mounted relative to the holder means and movable between a first position wherein the compression element does not substantially compress the flexible wall and a second position wherein the compression element substantially compresses the flexible wall.

The holder means comprises a plurality of selectively relatively movable holder components for accommodating different sized containers. Locking means is operatively associated with the relatively movable holder components for selectively locking the movable holder components against relative movement.

The liquid delivery tube comprises a plurality of liquid delivery tube segments and connector means for releasably connecting the segments.

The container defines an opening communicating with the interior thereof. A cap is connected to the container at the opening and defines a passageway leading from the interior to the liquid delivery tube.

A check valve element is movably mounted relative to the cap between an open position and a closed position, the holder means engaging the check valve element when the container is held by the holder means and maintaining the check valve element in open position. The holder means is further cooperable with the check valve element to move the check valve element to closed position when the container is removed from the holder means.

Other features, advantages, and objects of the present invention will become apparent with reference to the following description and accompanying drawings.

MODES FOR CARRYING OUT THE INVENTION

Figure 1:
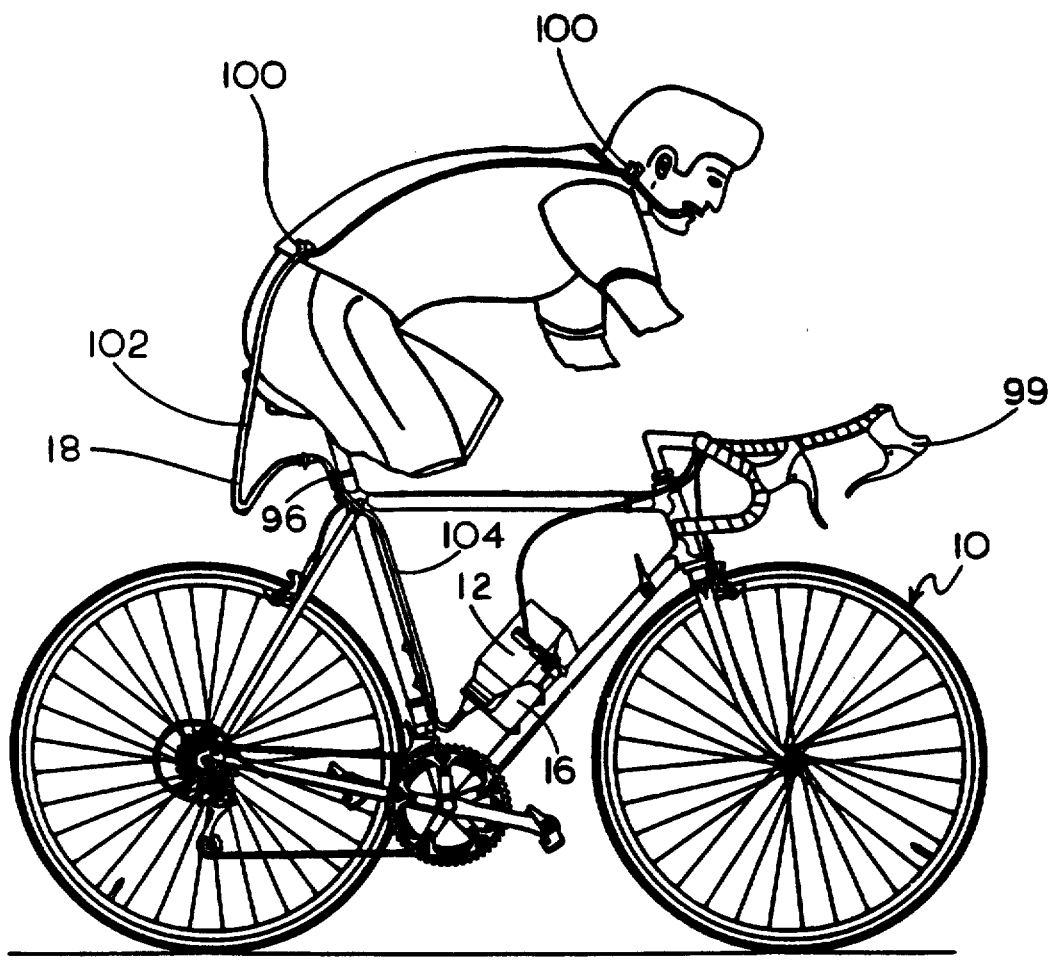
FIG. 1 is a side view of a bicycle equipped with apparatus constructed in accordance with the teachings of the present invention.
Figure 2:
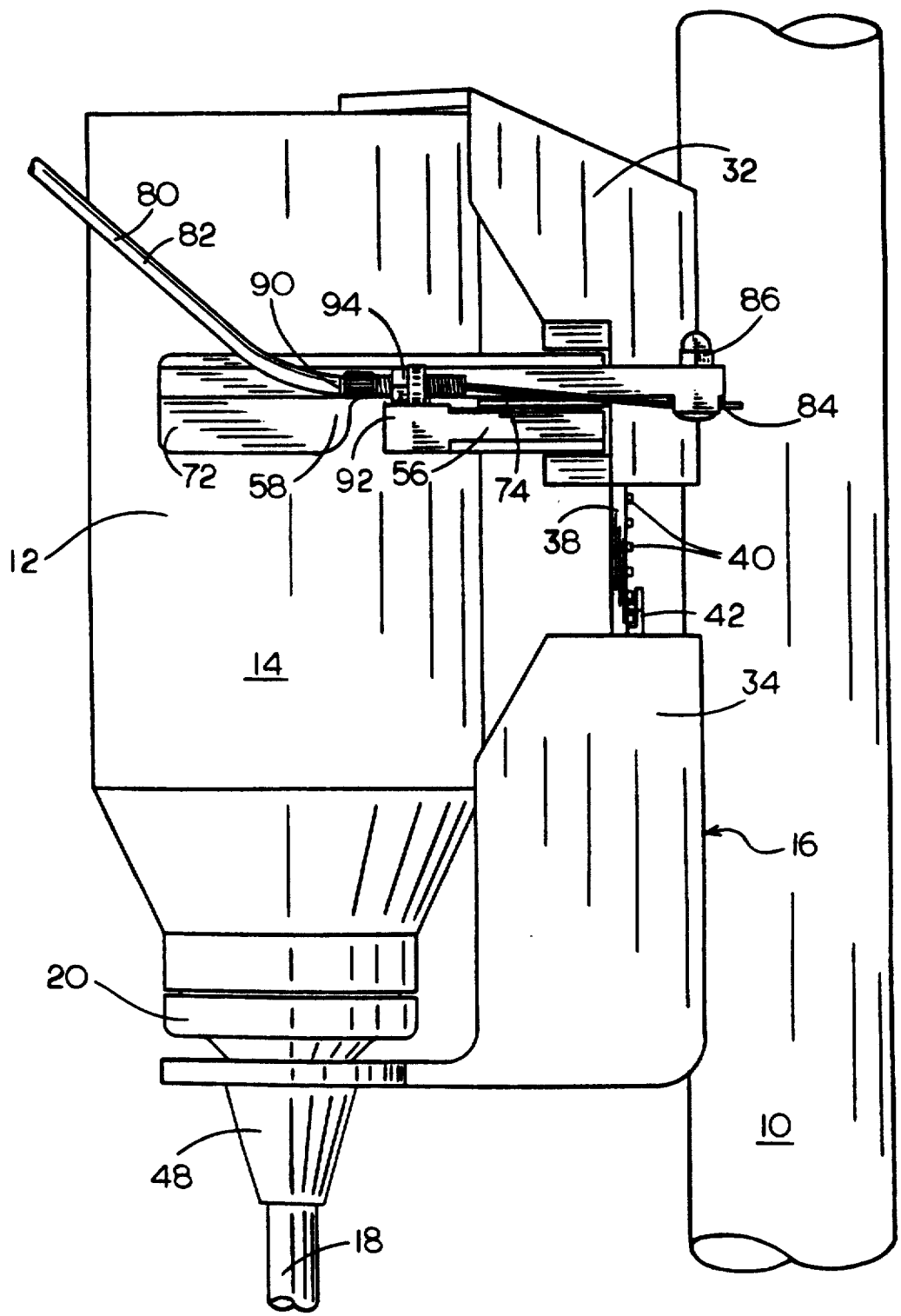
FIG. 2 is an enlarged side view of selected structural components of the apparatus, including a container, a holder for the container and compression means for compressing the container wall.
Figure 3:
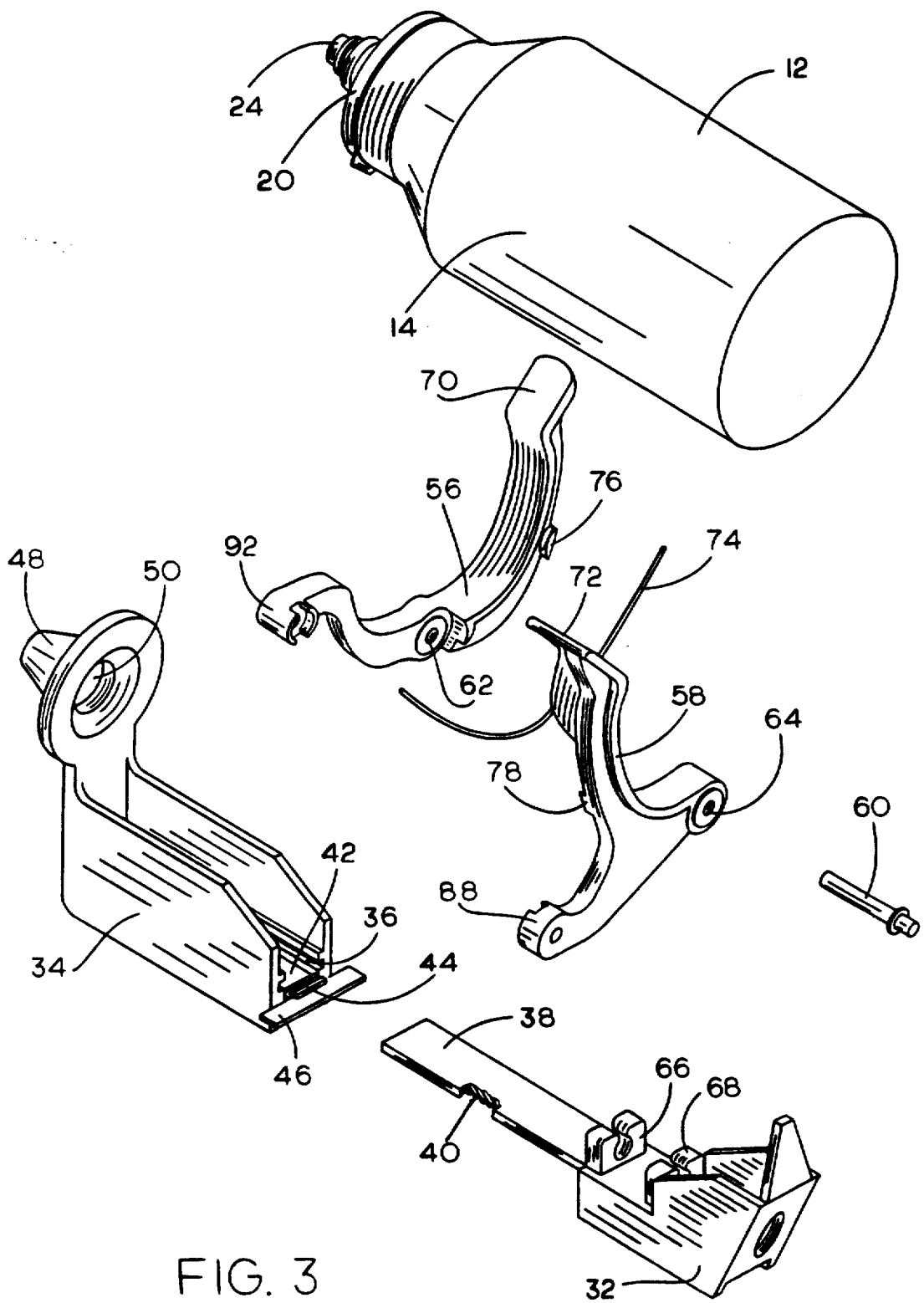
FIG. 3 is an exploded view illustrating the components of FIG. 2 prior to assembly thereof.
Figure 4:
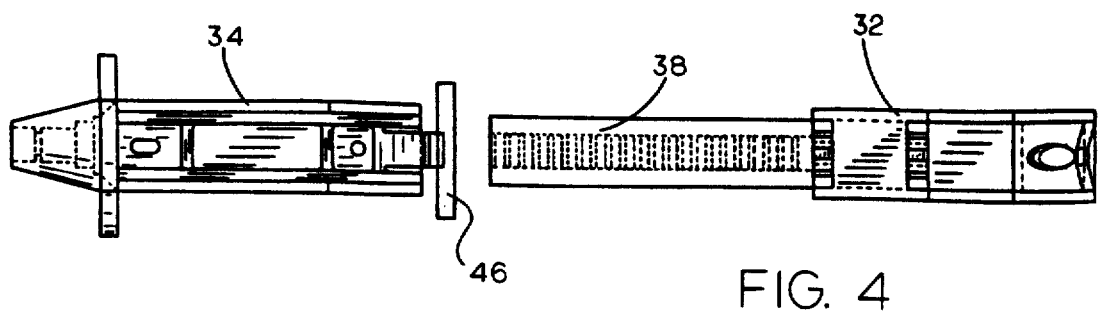
FIG. 4 is a plan view of components of the holder of the apparatus prior to assembly thereof.

Referring now to FIGS. 1-9, a preferred embodiment of apparatus constructed in accordance with the present invention is illustrated. The apparatus is for attachment to a bicycle 10 for delivering water or other liquid to the mouth of the bicyclist. The apparatus includes container 12 defining an interior for accommodating the liquid. In the arrangement illustrated, the container is formed of plastic or other suitable material to provide a flexible, cylindrically-shaped wall 14.

A holder 16 is provided for holding the container 12 on the frame of the bicycle. A liquid delivery tube 18 is for the purpose of delivering liquid from the interior of the container to the bicyclist.

Compression means is actuatable by the bicyclist for compressing the container wall and forcing liquid in the container into delivery tube 18. Valve means operatively associated with the liquid delivery tube prevents back flow of the liquid within the tube in the direction of the container.

Having broadly described the principal structural components of the apparatus, such components and their cooperative relationship will now be described in detail.

As stated above, wall 14 of container 12 is formed of a flexible material such as plastic. Secured to the neck of the container over the container opening is a cap 20. Securement may be had by any known expedient. In the arrangement illustrated, cap 20 is snap-fit over the neck of the container 12; however, it will be appreciated that screw threads or other commonly used fastening system may be employed. Cap 20 defines a passageway 22 leading from the interior of the container to the interior of liquid delivery tube 18.

Slidably disposed within the passageway of cap 20 is a check valve element 24 movable between an open position wherein communication is established between the interior and the liquid delivery tube through the passageway and a closed position wherein communication between the interior and the liquid delivery tube is terminated. As may best be seen with reference to FIGS. 7A-7C, check valve element 24 is of generally tubular shape having a closed end 26. The outer end of the check valve element is open and communicates with the hollow interior of the check valve element which is also in communication with a slot 28 formed in one or more sides of the check valve element.

Figure 7A:
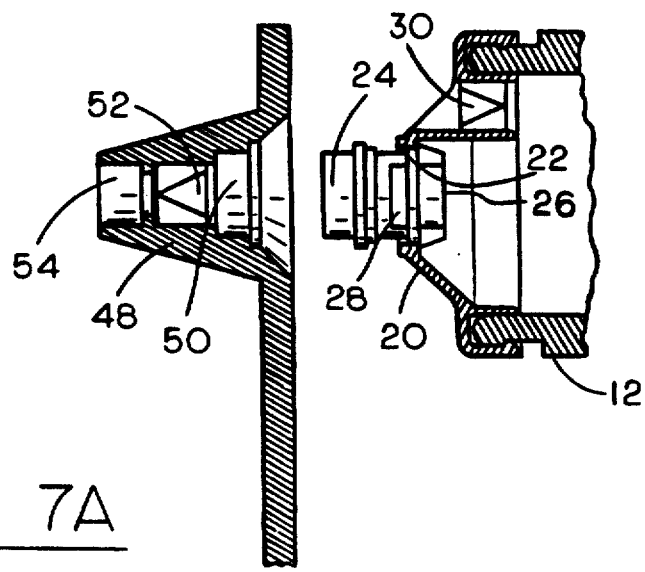
FIGS. 7A, 7B, and 7C, are enlarged, sectional, diagrammatic presentations illustrating the cooperative relationship between selected components of the apparatus at different stages of operation.
Figure 7B:
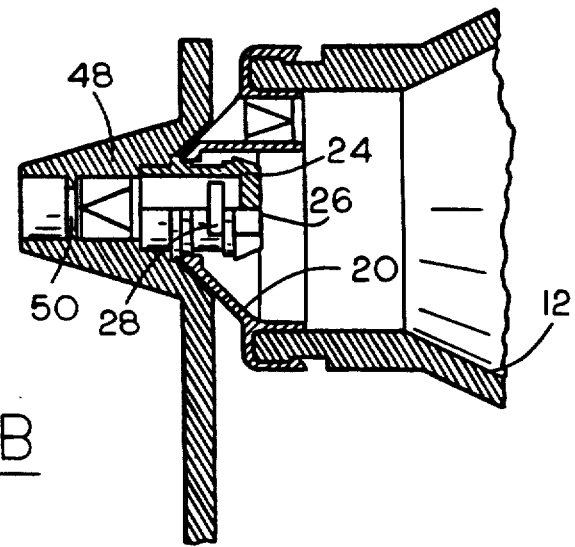
Figure 7C:
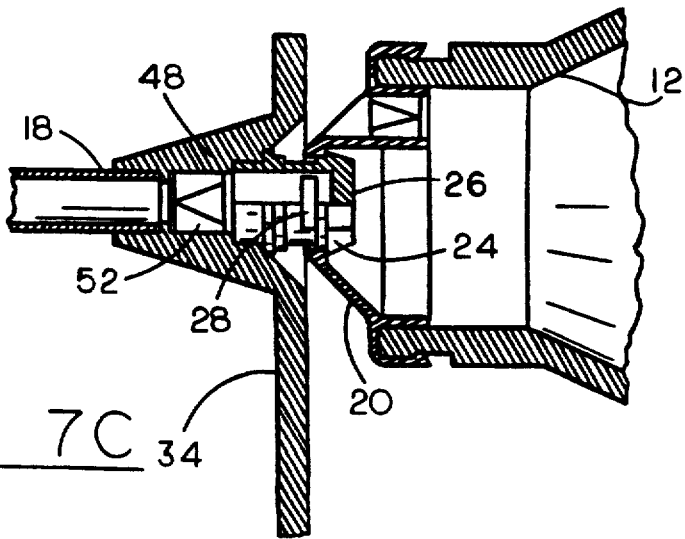

When the check valve element 24 is in the position disclosed in FIGS. 7A and 7C, the contents of the container are sealed off and cannot exit the container interior. When, however, the check valve element 24 is in the position illustrated in FIG. 7B, slot 28 communicates with the interior of the bottle and liquid may freely pass from the interior of the container through the slot and out the open end of the check valve element. An air inlet check valve 30 is installed in the cap to allow air to pass into the container interior when a vacuum condition exists within the interior. The cap and check valve element may be formed of any suitable material such as plastic.

As stated above, holder 16 is employed to hold or mount the container at a predetermined location on the bicycle, the bicycle frame being the most desired location. Holder 16 includes selectively relatively movable holder components 32, 34. As may be seen with reference to FIG. 3 and FIG. 4, holder components 32, 34 may be completely separated. When assembled, the relative positions of the holder components may be modified and locked into place to accommodate containers of different size.

Holder component 34 defines a channel or keyway 36 into which elongated member 38 of holder component 32 is slid. When the desired overall length of the holder is attained, the holder components are locked against relative movement by locking means. In the arrangement shown, this is accomplished by virtue of the fact that elongated member 38 is, in effect, a rack element having a plurality of spaced projections 40 projecting from one side thereof. These projections 40 define a saw-toothed configuration so that the projections can slide over a flexible lock member 42 having a detent 44 when the holder components are being moved toward one another.

Figure 5:
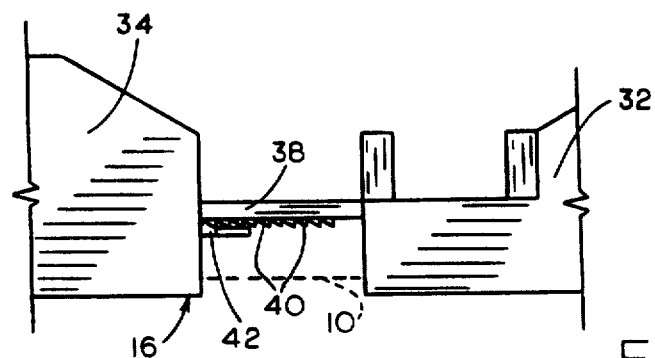
FIGS. 5 and 6 are sectional, somewhat diagrammatic views illustrating the holder components in assembled condition in differing relative positions.
Figure 6:
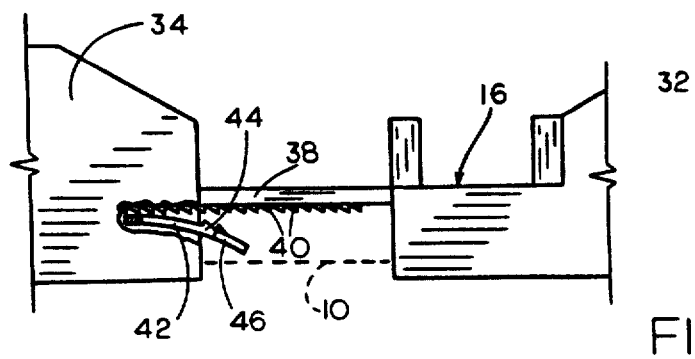

The lock member 42 normally occupies the position shown in FIG. 5 wherein the detents 44 thereof are positioned within indents defined by projections 40. A handle 46 is formed at the free distal end of the lock member so that the user may manually deflect the lock member away from elongated member 38 to disengage the detents from between the projections 40, when desired, so that the holder components 32, 34 may be pulled apart.

Holder component 34 includes a receptacle 48 which is connected to liquid delivery tube 18 and defines a fluid flow path 50 which is in communication with the interior of the liquid delivery tube. In the arrangement shown, a one ay or check valve 52 is disposed within fluid flow path 50. One way valve 52 allows liquid to pass out tapered end 54 of the receptacle but no back flow in the direction of the container 12. When the container and cap are in the position shown in FIG. 7B, the check valve element 24 is disposed between the one way valve 52 and the interior of the container.

Receptacle 48 and the distal end check valve element 24 are snugly fit when the components are in place for dispensing as shown in FIG. 7B. Thus, the check valve element 24, which was previously in its closed position, will be moved to its open position by the receptacle. When the container and cap are being removed from the holder and receptacle as shown in FIG. 7C, the friction fit between the receptacle and the check valve element will cause the check valve element to move outwardly, that is, to its closed position, so that the contents of the container, if any, will not spill. One way valve 52, as stated above, will prevent the contents of the liquid delivery tube from emptying.

Means are provided for selectively compressing wall 14 of container 12 to force the liquid contents of the container out through check valve element 24 and receptacle 48 into liquid delivery tube 18. In particular, compression is accomplished by compression elements in the form of curved arms 56, 58 which engage opposed sides of the wall 14.

A pin 60 (See FIG. 3) passes through apertures 62, 64, respectively, formed in the curved arms 56, 58. Pin 60 pivotally connects the curved arms to holder component 32, the pin passing through the holes formed in mounting projections 66, 68 of holder component 32. The curved arms 56, 58 are pivotally movable relative to each other and to the holder component 32. The curved arms 56, 58 have arm ends 70, 72, respectively, which exert a squeezing force on the container wall 14 when the arm ends move toward one another.

Biasing means in the form of a length of spring steel wire or rod 74 is positioned so that the ends thereof exert an outwardly directed force on protrusions 76, 78 located on curved arms 56, 58, respectively. That is, the biasing member 74 will have a tendency to straighten, which will continuously bias or urge the arm ends 70, 72 away from each other.

A cable of the type utilized as a bicycle brake cable is the expedient utilized to move the arm ends 70, 72 together against the bias of biasing means 74. Cable 80 is similar to conventional bicycle brake cables and includes an outer sheath 82 within which is disposed an inner cable member 84 which slides within the sheath. A mechanical fastener 86 secures the distal end of inner cable member 84 to segment 88 integral with the curved arm 58. The sheath portion of the cable 80, on the other hand, is secured at its end 90 to the portion of curved arm 56 opposed to arm end 70, such portion being designated by reference numeral 92. Any suitable mechanical fastener 94 may be utilized for such purpose.

When the inner cable member 84 is pulled or withdrawn in the direction of sheath 82, segment 88 will be pulled toward curved arm portion 92, thus moving arm ends 70, 72 toward one another to squeeze the container wall and force liquid into the liquid delivery tube. Preferably, this action is initiated at or near the handle bars of the bicycle through any suitable actuator handle, such as handle 99, similar to a bicycle brake handle.

Figure 9:
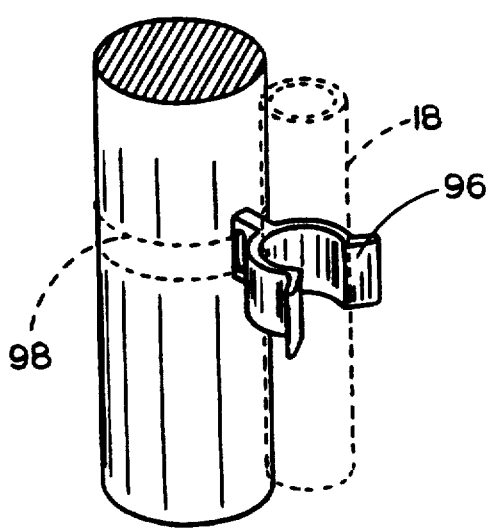
FIG. 9 is an enlarged, perspective view of a tube holder employed to attach the liquid delivery tube to a bicycle frame.

The liquid delivery tube is preferably secured along a portion thereof by a clip of the type shown in FIG. 9 and designated by reference numeral 96. The clip may be secured at one end thereof by a cable tie 98, the clip being so configured as to permit the liquid delivery tube to be readily snapped in and out of the open end thereof when desired by the bicyclist or if the bicyclist falls off the bicycle by accident. Other suitable clips 100 may be utilized to secure the liquid delivery tube to the clothing of the cyclist.

The liquid delivery tube is formed from a plurality of liquid delivery tube segments secured together. Such an arrangement allows a cyclist to make the tube of any desired length. Also, the tube may be then be broken down when desired and stored as separate tube segments. In the arrangement shown there are two such segments 102, 104, although it is to be understood that any plurality of segments may be employed.

Figure 8:
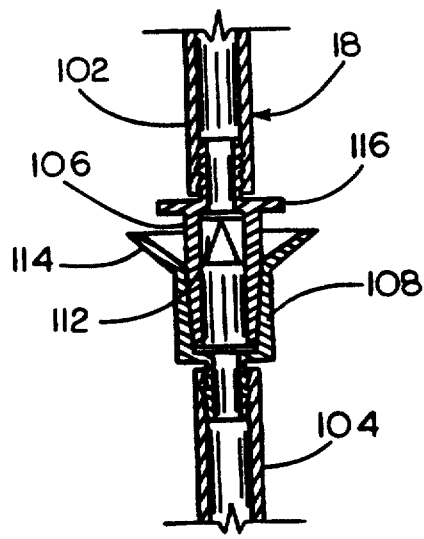
FIG. 8 is a partial, cross-sectional view of liquid delivery tube segment ends and connector means and valve means operatively associated therewith.

FIG. 8 discloses details of a quick release connector for connecting tube segments 102, 104. A male connector element 106 is inserted into a female connector element 108. The flare opening of female connector element 108 assists the rider in joining the two connector elements. The walls of male connector element 106 and the walls of female connector element 108 are sized and tapered for air-tight fit. A check valve 112 is built into male connector element 106 to prevent liquid flowing therefrom when it is disconnected from the female connector element. Protruding or flared members 116, 114 assist in gripping the connector elements when connecting or disconnecting them. The connector elements are barbed at their ends to join them to their associated tube segments.

Figure 10:
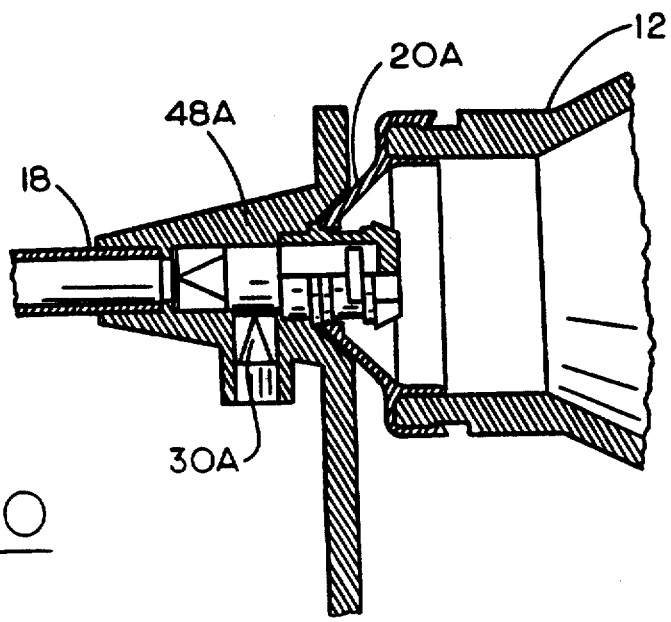
FIG. 10 is a view similar to FIG. 7B but illustrating an alternative embodiment of receptacle employed when practicing the teachings of the present invention.

FIG. 10 shows an alternative embodiment of the invention wherein a receptacle 48A is employed which has an air inlet valve 30A therein. Cap 20A is similar to previously described cap 20, but has no air inlet valve therein.

Figure 11:
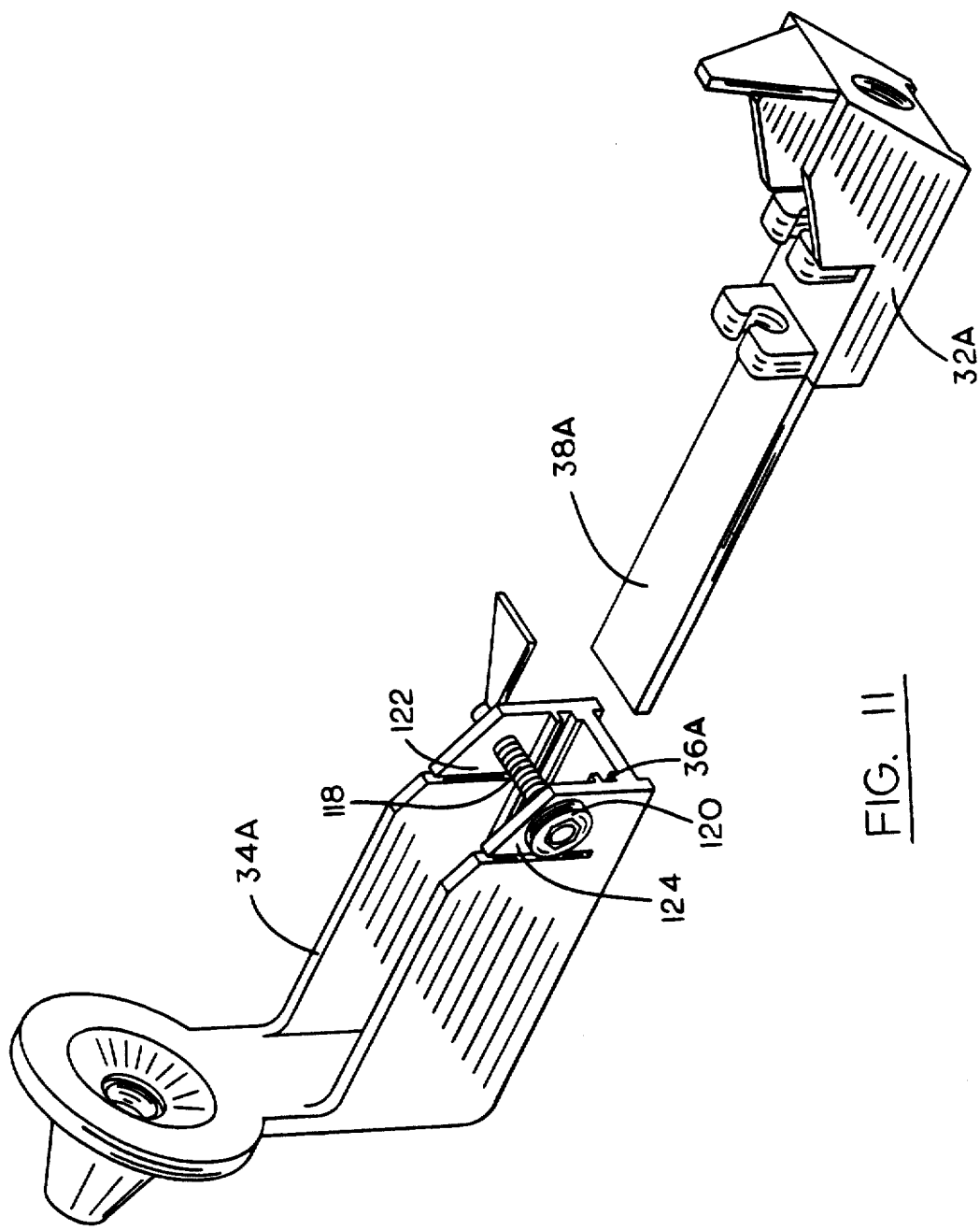
FIG. 11 is a perspective view of another form of container holder with the holder components shown separated.

FIG. 11 shows another form of holder incorporating holder components 32A and 34A. Elongated member 38A is smooth along its bottom and enters channel 36A of holder component 34A. A screw type fastener 118 cooperating with a nut 120 is employed to move wall segments 122, 124 together to clamp the elongated member 38A into the desired position.

Figure 12:
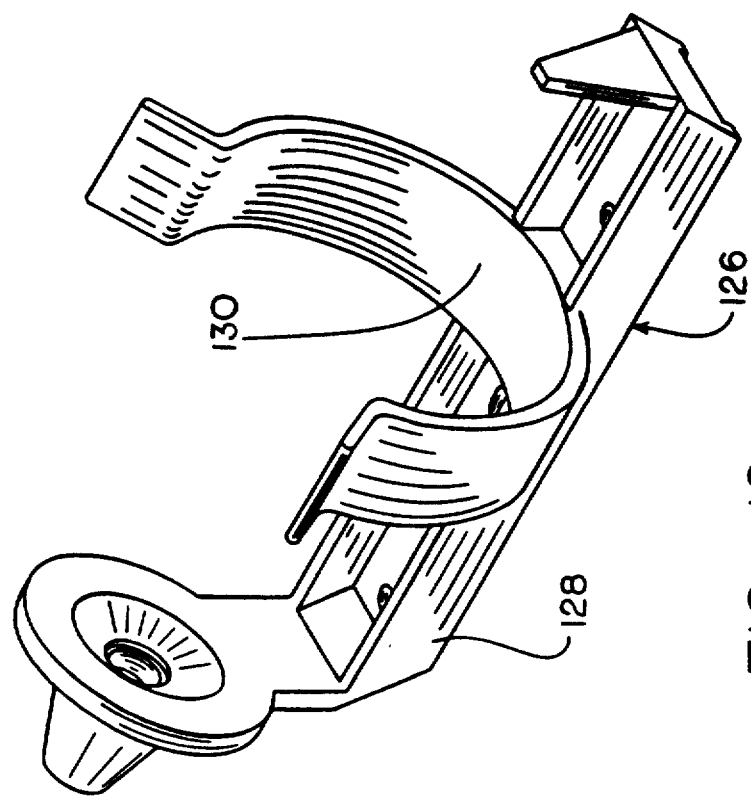
FIG. 12 is a perspective view of an alternate form of container holder in assembled condition.
Figure 13:
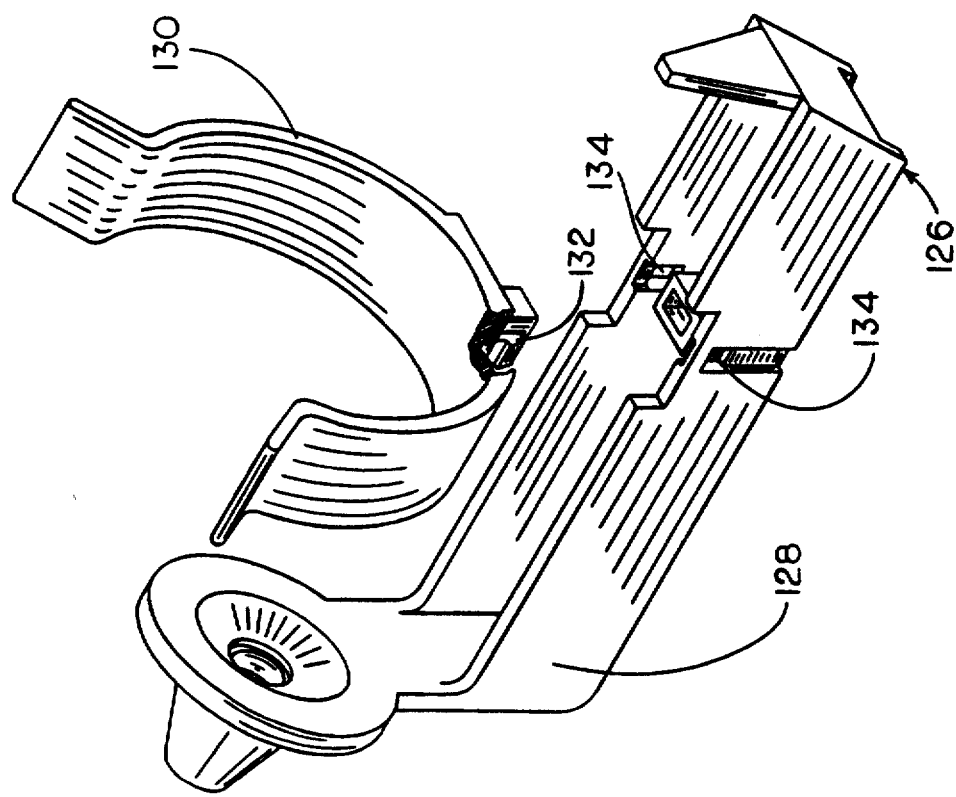
FIG. 13 is an exploded, perspective view of the holder of FIG. 12 with the holder components separated.

FIGS. 12 and 13 show yet another form of holder. Holder 126 is not axially adjustable. The holder 126 includes a primary component 128 and a holder arm component 130 which is snapped into position and connected to the holder element 128 by flexible lock elements 132 (only one of which is shown) which snap into openings 134.

I claim:

1. In apparatus for dispensing liquid into the mouth of an individual riding a bicycle, the combination comprising:

holder means for attachment to said bicycle and for holding a liquid container having a liquid discharge end and a side wall, said holder means including two selectively relatively movable holder components for accommodating different sized containers, one of said relatively movable holder components defining a channel and the other of said relatively movable holder components including an elongated member adjustably slidably positioned in said channel; and locking means operatively associated with said relatively movable holder components for selectively locking said elongated member against movement within said channel at preselected positions within said channel, one of said holder components including a receptacle for receiving the liquid discharge end of said container and the other of said holder components including engaging means for engaging said container at a location spaced from the liquid discharging end.

2. Apparatus for attachment to a bicycle for releasably holding a liquid container for dispensing liquid into the mouth of an individual, the apparatus comprising, in combination:

holder means for attachment to said bicycle for holding a liquid container having a liquid discharge end, a non-discharge end, and a side wall, said holder means having first and second selectively relatively movable holder components for accommodating different sized containers; and locking means operatively associated with said relatively movable first and second holder components for selectively locking said movable holder components against relative movement, said first holder component for receiving the liquid discharge end of said container and said second holder component for engaging said container at said non-discharge end, one of said holder components including a rack element having a plurality of spaced projections defining indents therebetween, said locking means including a detent selectively positionable in said indent.

3. The apparatus according to claim 2 wherein said locking means further includes a manually manipulable lock member attached to one of said holder components and manually movable relative thereto, said detent being affixed to said lock member and movable therewith upon manual manipulation of said lock member to selectively position said detent in said indents.

4. The apparatus according to claim 2 wherein said first and second holder components are connected to relative slidable movement.

* * * * *